(12) United States Patent
Fourre et al.

(10) Patent No.: US 11,327,025 B2
(45) Date of Patent: May 10, 2022

(54) AUTHENTICATION BY OPTICAL INDEX

(71) Applicant: Idemia Identity & Security France, Courbevoie (FR)

(72) Inventors: Joël-Yann Fourre, Courbevoie (FR); Alain Thiebot, Courbevoie (FR); Marina Pouet, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 344 days.

(21) Appl. No.: 16/544,115

(22) Filed: Aug. 19, 2019

(65) Prior Publication Data

US 2020/0057000 A1  Feb. 20, 2020

(30) Foreign Application Priority Data

Aug. 20, 2018 (FR) ...................... 1857547

(51) Int. Cl.
*G01N 21/84* (2006.01)
*G06V 40/13* (2022.01)
(Continued)

(52) U.S. Cl.
CPC ............. *G01N 21/84* (2013.01); *G02B 6/102* (2013.01); *G06F 3/0421* (2013.01); *G06F 21/32* (2013.01);
(Continued)

(58) Field of Classification Search
CPC ...... G01N 21/84; G02B 6/102; G06F 3/0421; G06F 21/32; G06K 9/0004;
(Continued)

(56) References Cited

U.S. PATENT DOCUMENTS

| | | |
|---|---|---|
| 9,400,916 B1 | 7/2016 | Brownlee |
| 2012/0218397 A1 | 8/2012 | Monden |

(Continued)

FOREIGN PATENT DOCUMENTS

EP  2495697 A1  9/2012

OTHER PUBLICATIONS

Huafeng Ding, Jun Q. Lu, William A. Wooden, Peter J. Kragel and Xin-Hua Hu: "Refractive indices of human skin tissues at eight wavelengths and estimated dispersion relations between 300 and 1600 nm". Physics in Medicine and Biology. Mar. 1, 2006, pp. 1479-1489 vol. 51. No. 6. Institute Of Physics Publishing, Bristol GB.

(Continued)

*Primary Examiner* — Stephen G Sherman
(74) *Attorney, Agent, or Firm* — Womble Bond Dickinson (US) LLP

(57) ABSTRACT

Disclosed is a fraud detection method to authenticate that an object is formed of human skin. The method includes an object being placed on a home location on the surface of a propagation medium of a sensor, lighting the home location of the surface by a light source emitting light rays illuminating the home location forming with said surface a plurality of incidence angles encompassing a critical angle defined by the refraction index of the propagation medium and by a refraction index expected for authentic human skin, receipt by an imager of light rays from the surface, and acquisition of an image, and determining whether the object matches an authentic human finger based on the refraction index of said object, as a function of the spatial light distribution on the acquired image.

11 Claims, 4 Drawing Sheets

(51) Int. Cl.
  *G02B 6/10* (2006.01)
  *G06F 3/042* (2006.01)
  *G06F 21/32* (2013.01)
  *G06V 40/12* (2022.01)

(52) U.S. Cl.
  CPC ...... *G06V 40/1318* (2022.01); *G06V 40/1365* (2022.01)

(58) Field of Classification Search
  CPC ........... G06K 9/00087; G06K 9/00107; G06V 40/1318; G06V 40/1365
  See application file for complete search history.

(56) References Cited

U.S. PATENT DOCUMENTS

| | | |
|---|---|---|
| 2016/0275335 A1 | 9/2016 | Besson et al. |
| 2018/0032827 A1 | 2/2018 | Boutet et al. |
| 2021/0192169 A1* | 6/2021 | Huang ................ G06F 3/04166 |

OTHER PUBLICATIONS

Search Report of the National Institute of Industrial Property of France for FR1857547 dated Jul. 6, 2019.

* cited by examiner

AUTHENTICATION BY OPTICAL INDEX

CROSS-REFERENCE TO RELATED APPLICATIONS

This application claims the benefit of French patent application no. 1857547 filed Aug. 20, 2018, the disclosure of which is herein incorporated by reference in its entirety.

CONTEXT AND TECHNOLOGICAL BACKGROUND

The present invention relates to a method of fraud detection for authenticating that an object whose image has been acquired by a fingerprint sensor is covered with human skin, and is not, therefore fraud, or to the contrary, in order to detect fraud.

Fingerprint identification is one of the techniques used for biometric identification. An image of an illuminated finger is acquired and analyzed to identify an individual. The most commonly used method consists of acquiring the image of the finger when it is placed on a surface, and exploiting the optical interactions between the finger and that surface. This is particularly true of the so-called Total Internal Reflection (TIR) method, wherein the differences in refraction index between air and human skin are used to highlight the ridges and valleys of the fingerprints.

In the identification processes, an image of an illuminated finger is acquired and analyzed to identify an individual. However, it is possible to use decoys, false fingers that reproduce the characteristics on which the image analysis is based, in particular reproducing fingerprints. The simplest shape for tricking a biometric sensor based on analyzing the surface of a human finger consists of presenting the sensor with a paper reproduction of a human finger having fingerprints. Thus, in the ordinary case of fingerprint detection, a photograph is presented, either flat or wrapped around a finger, on which a finger with its fingerprints is reproduced. A more advanced form consists of placing a decoy made of silicon or another material, such as gelatin or latex onto the surface of a finger presented to the sensor, said decoy reproducing fingerprints. It is, therefore, necessary to additionally provide a validation method to validate that the analyzed object is indeed a part of the human body, most commonly a finger.

Various validation methods have been proposed, generally enlisting various properties of a live finger that are to some extent difficult to reproduce. These methods aim to detect fraud by using various characteristics of the object presented, such as the impedance, the absorption and diffusion capacities of the object. For instance, one solution described by the application FR2849246 A1 calls for measuring the impedance of an object to be authenticated in order to detect fraud. Document US 2016/275335 A1 deals with a fraud detection method for authenticating that an object is covered with human skin, which is based on using the absorption and diffusion capabilities of the object. This document only deals with the light rays that have encountered the object presented. Document U.S. Pat. No. 9,400,916 B1 discloses that the illumination of the surface on which the finger is affixed by the additional light is done directly. This additional light is configured to illuminate only a portion of the docking location, so that it has an illuminated and a non-illuminated area, by means of a hole in a black screen. All the light rays emitted by the additional light arriving at the surface pass through it. There is no reflection at the interface because there are no incident light rays illuminating the host location forming with said surface a plurality of angles of incidence encompassing at least one critical angle. Thus, none of these documents describes fraud detection based on the refraction index of the object encountered and, in fact, none of these documents describes a reflection at the object-surface interface because there is no incident light rays illuminating the host location forming with said surface a plurality of angles of incidence encompassing at least one critical angle, which would detect the refractive index of the object.

However, besides the variable effectiveness of these methods, they generally require complex, expensive, bulky devices. Additionally, they sometimes require a specific usage, such as a certain finger pressure, and the quality of the authentication then depends on the user's behavior. Still others requires major changes to the configurations of conventional sensors, such as, for instance, the need to provide transparent electrodes that enable electrical contact with the object to be authenticated.

Furthermore, authentication methods that involve the use of polarizing filters, besides the cost and complexity of their optics, create a substantial loss of light for the acquired image. Finally, authentication methods do not make it possible to implement other biometric methods, such as fingerprint recognition, which requires the coexistence of multiple imagers and makes the process more cumbersome.

BRIEF DESCRIPTION OF THE INVENTION

The purpose of the invention is to at least partially remedy these drawbacks and, preferentially all of them, and the invention is particularly meant to propose a method for easily detecting most fraud, without needing a complex structure or major changes to a conventional sensor. The invention makes it possible to detect fraud in a material whose optical refraction index does not match that of authentic human skin, and whose light diffusion is different from that of authentic human skin.

To that end, there is proposed a fraud detection method to authenticate that an object is covered by human skin, said object having a refraction index and being placed in a home location on the surface of a propagation medium of a sensor, said propagation medium having a refraction index $n_{medium}$, the method comprising the following steps:

lighting the home location of the surface through the propagation medium by incident light rays propagating within the propagation medium from a light source, said incident light rays illuminating the home location forming with said surface a plurality of incidence angles encompassing at least one critical angle defined by the refraction index $n_{medium}$ of the propagation medium and by a refraction index expected for authentic human skin.

receipt, by an imager, of light rays propagating within the propagation medium coming from the surface, said light rays coming from incident light rays forming angles of incidence with the surface that are less than or equal to a critical angle defined by the refraction index $n_{medium}$ of the propagation medium and by the refraction index of the object to be authenticated, and acquisition of an image by the imager, said image having a spatial light distribution depending on at least the object's refraction index, based on the image acquired, determining a light intensity profile as a function of a distance from the light source, the light intensity profile being representative of a spatial light distribution on the image acquired, based on the distance from the light source, determining at least one characteristic derived from the light intensity profile, determining whether there is a match between the object and authentic human skin by comparing the characteristic derived from the light intensity profile to a baseline characteristic representative of a light intensity profile corresponding to an expected spatial distribution for authentic human skin, and authenticating or not, that the object is covered with human skin according to the match determined.

The method makes it possible to authenticate that an object is covered with human skin, based on the refraction index presented by the object, estimated based on the total reflection phenomena on the surface where the object is arranged. The method makes it possible to easily detect most fraud, without needing a complex structure nor any major changes to a conventional sensor.

The method is advantageously supplemented by the following characteristics, taken alone or in any of their technically possible combinations:

the baseline characteristic corresponds to a light path comprising a critical angle defined by the refraction index $n_{medium}$ of the propagation medium and by a refraction index expected for authentic human skin;

the characteristic derived from the light intensity profile is representative of a decrease in light intensity in the light intensity profile;

the characteristic derived from the light intensity profile is a light intensity decrease position in the light intensity profile, and the baseline characteristic is a baseline position;

the decrease position is compared to an absorbance range bounded by a first baseline position corresponding to a maximum refraction index expected for authentic human skin and a second baseline position corresponding to a minimum refraction index expected for authentic human skin, and the object is determined as being covered with authentic human skin if the decrease position is within the absorbance range, the object is determined as not being covered with authentic human skin if the decrease position is outside the absorbance range.

the expected refraction index for authentic human skin is less than or equal to a maximum expected refraction index $n_{max}$ and the plurality of angles of incidence formed by light rays comprises incidence angles α greater than $$\sin^{-1}\left(\frac{n_{max}}{n_{site}}\right)$$

where $n_{max}$ is less than or equal to 1.48 and greater than or equal to 1.42;

the expected refraction index for authentic human skin is greater than or equal to a maximum expected refraction index $n_{min}$ and the plurality of angles of incidence formed by light rays comprises incidence angles α less than $$\sin^{-1}\left(\frac{n_{min}}{n_{medium}}\right)$$

where $n_{min}$ is greater than or equal to 1.38 and less than or equal to 1.44;

the derived characteristic is a shape of the light intensity profile, and the determining of whether the object matches authentic human skin corresponds to comparing the shape of the light intensity profile to a plurality of baseline profiles corresponding to known optical characteristics, said known optical characteristics comprising at least refraction indices;

the incident light rays illuminating the home location of the surface are in wavelengths measuring less than 600 nm;

incident light rays illuminating the home location of the surface are in wavelengths less than 600 nm, and other incident light rays illuminating the home location of the surface are in wavelengths greater than 600 nm.

The invention also relates to a computer program product comprising program code instructions for carrying out the steps of the method according to any of the embodiments of the invention when said program is run by a computer.

Lastly, the invention relates to a biometric analysis system for an object to be authenticated as being covered in human skin, comprising a sensor, said sensor comprising:

a propagation medium comprising a surface with a home location intended to receive the object to be authenticated, a light source configured to light the home location of the surface through the propagation medium by incident light rays propagating within the propagation medium, said incident light rays illuminating the home location forming with said surface a plurality of incidence angles encompassing at least one critical angle defined by the refraction index $n_{medium}$ of the propagation medium and by a refraction index expected for an authentic human finger, an imager adapted to receive light rays propagating within the propagation medium coming from the surface, said light rays coming from incident light rays forming angles of incidence with the surface that are less than or equal to a critical angle defined by the refraction index $n_{medium}$ of the propagation medium and by the refraction index of the object to be authenticated, and for acquiring an image, the system being configured to implement the fraud detection method according to the invention.

DESCRIPTION OF THE FIGURES

The invention will be better understood through the description below, which relates to embodiments and variants according to the present invention, given as non-limiting examples and explained with reference to the attached schematic drawings, in which.

DETAILED DESCRIPTION

As indicated above, frauds aimed at fooling a fingerprint sensor generally use false fingers that reproduce various characteristics of an authentic human finger (fingerprints, shapes, and colors). However, the optical characteristics of human skin are hard to counterfeit. In particular, the refraction index of human skin and its light absorption and diffusion characteristics are difficult to faithfully reproduce. The invention is therefore meant to detect fraud attempts by using the differences in refraction indices between authentic human skin and a decoy. In order to simply and reliably show the refraction index of the object presented on the surface of a biometric sensor, the invention proposes to illuminate the presented object in a particular way, and to exploit the results.

Sensor

Figure 1:
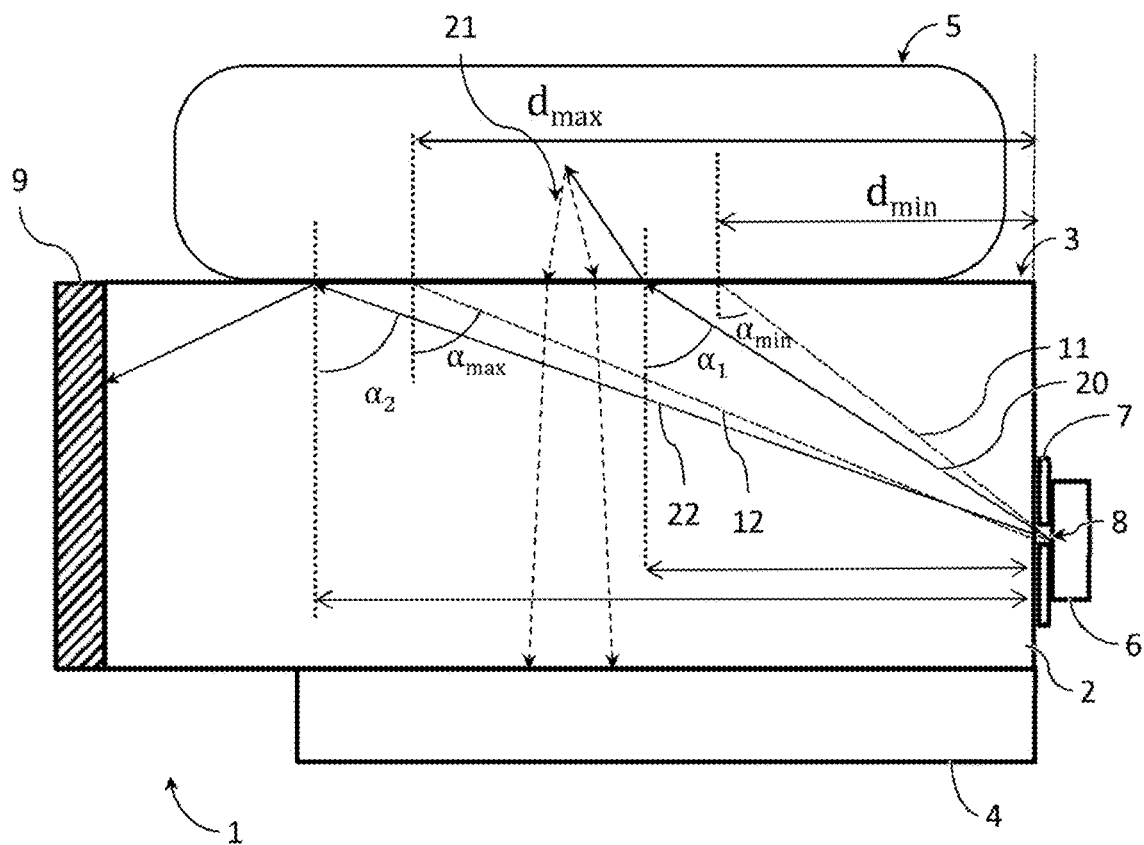
FIG. 1 schematically depicts an overview of a sensor implementing the method according to one possible embodiment of the invention, FIG. 2 schematically depicts an overview of a sensor implementing the method according to one possible embodiment of the invention, wherein the propagation medium takes the form of a prism, FIGS. 3, 4, and 5 schematically depict example images obtained for objects having different refraction indices, FIGS. 6, 7, and 8 schematically depict example light intensity profiles as a function of the distance from the light source for several different objects.
Figure 2:
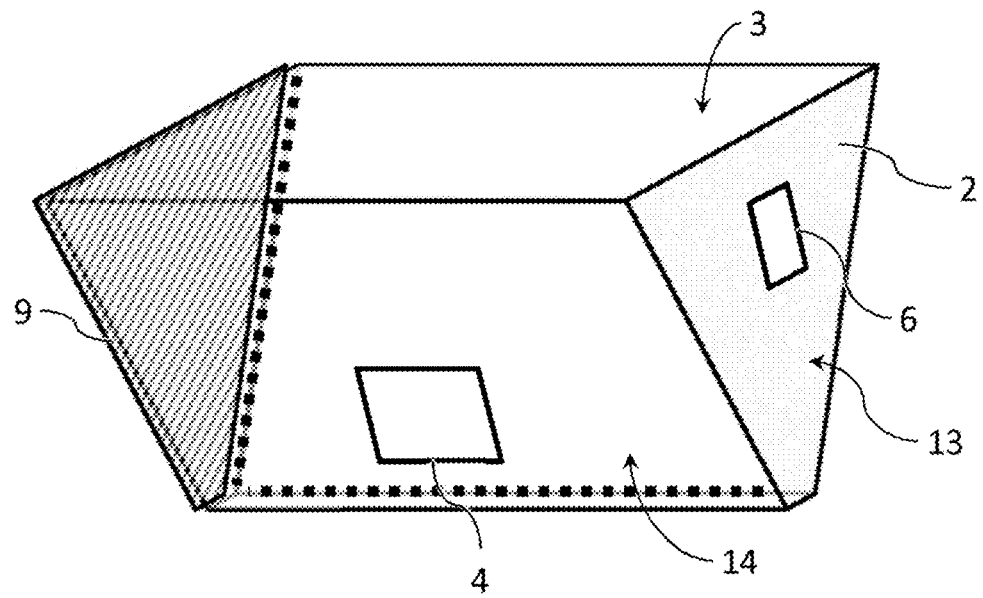

The invention is implemented by means of a system comprising a biometric fingerprint sensor. With reference to FIGS. 1 and 2, the biometric sensor comprises a propagation medium 2 generally formed by a prism or blade, preferably a blade with a prismatic output face such as the one described in applications FR2862408 or FR2861200, made of a transparent material with a refraction index $n_{medium}$ greater than that of human skin, and therefore greater than 1.40 (at 589 nm), and preferably greater than 1.47, or even 1.49. The propagation medium 2 may, for instance, be one made of glass or methyl polymethacrylate.

The following table gives the refraction indices of common materials at 589 nm, which can be used to form the propagation medium 2:

TABLE 1

| Glass N-BK7 (Shott) | 1.5168 |
| PMMA | 1.4917 |
| Polycarbonate | 1.585 to 1.586 |
| Glass N-SF4 (Shott) | 1.7551 |
| Zeonex ® | 1.53 |
| Fused silica | 1.4584 |

The propagation medium 2 has a surface 3 intended to receive object 5, which is to be checked to tell whether it is authentic human skin. In the absence of such an object 5, that surface 3 forms an interface between the propagation medium 2 and the air. A home location is provided on surface 3 for positioning the object 5 to be authenticated. This is generally a position in the center of the surface 3. A presence detection method may be provided which analyzes an acquired image to verify the positioning of the object 5 to be authenticated on the location dedicated to it, and to alert the user if it is poorly positioned, meaning when the object 5 to be authenticated does not cover the home location. Depending on the type of biometric sensor, the expected object 5 to be authenticated on the home location may, for instance, take the form of an object, multiple objects, the palm of a hand, or an entire hand. The shape and extent of the location provided for positioning the object 5 to be authenticated varies accordingly.

The sensor also comprises an imager 4 configured to acquire at least one image of the surface 3 on which the object 5 to be authenticated is resting. In the example illustrated by FIG. 1, the imager 4 is placed facing the surface 3, on the opposite side from the propagation medium 2. The imager 4 is arranged to receive the light diffused in the object 5 placed on the surface 3, and to not receive light from light rays fully reflected on the surface 3 of the propagation medium 2, which will be absorbed by the absorbing screen 9. Other arrangements are, however, possible.

In particular, it is possible to edit the presented configuration in order to limit the imager's receipt of outside rays via the surface 3. In the configuration illustrated by FIG. 2, the propagation medium 2 takes the form of a prism having the surface 3, a side face 13 and a front face 14. On a side face opposite the side face 13 is the absorbent screen 9. The front face 14 and the rear face across from it are tilted relative to the surface 3, forming an angle of 40 to 70° relative to the surface 3. The rays from outside pass through the surface 3 with an angle of incidence relative to the normal that is less than the total reflection critical angle when the external medium is the air passing through the propagation medium 2 to the face opposite the surface 3. Only the rays that are heavily tilted after being removed from the object 5 placed on the surface 3 bounce between the front face 14 and the rear face until reaching the imager 4.

In all cases, a light source 6 is arranged in such a way as to emit light rays in the propagation medium 2 in the direction of the surface 3 to illuminate the location intended to receive the object 5. In the illustrated examples, the light source 6 is in one side of the propagation medium 2, while the surface 3 is at the top and the imager 4 is at the bottom of the propagation medium 2. Other configurations may be foreseen, such as using reflective deflection surfaces. The light source 6 may, for instance, be a light-emitting diode or a laser diode. Preferably, the light source 6 emits light in the form of a non-collimated beam, with a light cone having a certain wealth of angles. If the intrinsic divergence of a laser diode is not sufficient, it is possible to increase that divergence with a lens in front of the light source 6. Preferably, the light source 6 has a light emission surface less than 1 mm in diameter. In order to restrict the light emission surface of the light source 6 in the case of a light-emitting diode, for instance, a cover 7 may be present between the light source 6 and the propagation medium 2, said cover 7 having an opening 8 that allows light rays from the light source 6 directed to the surface 3 to pass into the propagation medium 2.

The light source 6 is configured to emit light rays propagating in the propagation medium 2. Preferably, these light rays are in wavelengths less than 600 nm, and preferably less than 560 nm, in order to limit the propagation of light within the object to be authenticated. This is because much more green or blue light is absorbed by human tissue (including skin) than red light, which allows it to propagate less far into such tissue and, therefore, skin re-emits less light outside of directly illuminated areas.

The light source 6 is configured to illuminate the home location of the surface 3 through the propagation medium 2 by light rays propagating in the propagation medium 2, said light rays illuminating the home location forming with the normal to said surface 3 a plurality of angles of incidence α. The plurality of angles of incidence formed by the light rays illuminating the home location encompasses at least one critical angle defined by the refraction index $n_{medium}$ of the propagation medium and by a refraction index expected for authentic human skin. Preferably, the plurality of angles of incidence formed by the light rays also encompasses a critical angle defined by the refraction index $n_{medium}$ of the propagation medium and by a refraction index expected for authentic human skin. The light rays from the light source 6 thereby have angles of incidence that extend from at least one side of said critical angle, and preferably both sides, meaning the angles of incidence greater than and/or less than that critical angle.

Preferably, the plurality of angles of incidence formed by the light rays encompasses a plurality, and preferably all of the critical angles defined by the refraction index $n_{medium}$ of the propagation medium and by a range of refraction indices expected for authentic human skin. The light rays from the light source 6 thereby have angles of incidence comprised within a set of critical angles as well as angles of incidence outside said set of critical angles, smaller or greater.

The critical angles defined by the refraction index $n_{medium}$ of the propagation medium and by a range of refraction indices expected for authentic human skin define an angular criticality range, which is bounded by an angle of incidence $\alpha_{min}$ formed with the surface 3 by a first light path 11 and by an angle of incidence $\alpha_{max}$ with the surface 3 by a second light path 12. As indicated above, the light rays from the light source 6 form a plurality of angles of incidence with the surface 3, at least some of which form part of the angular criticality range. Preferably, the light rays from the light source 6 form a plurality of angles of incidence, at least some of which are greater than the angles of the angular criticality range, i.e. angles of incidence $\alpha$ greater than $\alpha_{max}$. Also preferably, the light rays from the light source 6 form a plurality of angles of incidence, at least some of which are smaller than the angles of the angular criticality range, i.e. angles of incidence $\alpha$ less than $\alpha_{min}$.

Only some of the light rays from the light source 6 pass through the opening 8, as the rest of the light rays are blocked by the cover 7. As a result, the light rays from the light source 6 propagating in the propagation medium 2 have angles of incidence fairly close to the surface 3. In other words, the cover makes it possible to restrict the angle range of the light rays seen from a point on the surface 3 illuminated by the light source. Thus, a point of the surface 3 illuminated by the light source receives light rays with angles of incidence close to one another. The weak dispersion of the angles of incidence at one point of the surface 3 makes it possible to achieve clearer differentiation between the various areas of the surface 3 appearing in the image acquired by the imager 4.

Furthermore, it is possible that not all of the considered angles of incidence can be achieved with a single light emission configuration. The cover 7 may in such cases be a movable cover or a liquid crystal display whose masking is modified, and the opening 8 may then be moved relative to the light source 6 in order to modify the angles of incidence of the light rays. It is also possible to provide that the light source 6 be made of a plurality of light sources placed at different positions relative to the surface 3 and, in particular, at different heights relative to the surface 3. The emission of light rays may then take place in multiple steps, while editing the emission configuration, e.g. by means of the cover 7 or by changing the source. It is also possible to use a laser scanning the surface 3, e.g. for the integration duration of the imager 4.

It is particularly advantageous to use multiple light sources, e.g. light-emitting diodes, even of the same color, disposed in different locations. This is particularly useful in the event that the object 5 is not perfectly disposed in the location provided on the surface 3 and/or to consolidate multiple measurements each taken with different lighting. It is particularly possible to provide lighting sources on opposite sides of a prism or blade forming the propagation medium 2. It is also possible to use light sources of different colors, preferably with light sources emitting in wavelengths less than 600 nm and other light sources emitting in wavelengths above 600 nm. This makes it possible to study the behavior of the object at multiple wavelengths, with the understanding that human skin does not react the same way to different wavelengths, and in particular has very different absorption at wavelengths below 600 nm and wavelengths above 600 nm.

Using a wavelength below 600 nm makes it possible to achieve an intensity profile with a steep decrease and a sharper edge. It is thereby easier to detect frauds using a material that diffuses in green. Conversely, using a wavelength above 600 nm makes it possible to achieve an intensity profile with a less steep decrease and a fuzzier edge. It is nonetheless thereby easier to detect frauds using a material that diffuses and/or absorbs in red.

It is thereby possible to use multiple light sources emitting simultaneously in different colors (particularly below 600 nm and above 600 nm), with a color imager 4 acquiring an image for each color, for instance by means of a Bayer filter. It is also possible to use multiple light sources sequentially emitting in different wavelengths or spread at different angles, while simultaneously acquiring multiple corresponding images. In particular, one can then implement the processing steps of the method for multiple colors, and then consolidate their results. One may also combine together the various images obtained, resulting in a final image onto which the fraud detection method is applied.

Consequently, under different conditions, it is possible to have incident light rays 20, 22 illuminating the home location of the surface 3 in wavelengths less than 600 nm, and other incident light rays 20, 22 illuminating the home location of the surface 3 in wavelengths greater than 600 nm.

It may be advantageous to improve the precision of the method to use multiple different configurations of light sources 6, in which the light rays incident to the surface 3 have angles of incidence within different respective ranges $[\alpha_{min}^i; \alpha_{max}^i]$ which nonetheless partially overlap, such that the union of those ranges encompasses the angular criticality range $[\alpha_{min}, \alpha_{max}]$. For example, in a first configuration, we can foresee incidence angles in a range $[\alpha_{min}^1; \alpha_{max}^1]$ with $\alpha_{min}^1 < \alpha_{min}$ and $\alpha_{min} < \alpha_{max}^1 < \alpha_{max}$, then a second configuration with incidence angles in a range $[\alpha_{min}^2; \alpha_{max}^2]$ with $\alpha_{min} < \alpha_{min}^2 < \alpha_{max}$ and $\alpha_{max} < \alpha_{max}^2$.

The light source 6 may have a specific angular distribution obtained by dioptric, catadioptric, or diffractive tools. One may, for instance, seek to have, at the home location for accommodating the object 5, either a uniform distribution of light, or a specific gradient of intensity as a function of the distance d from the light source 6. For the sake of clarity and simplicity, the light source 6 is considered in the rest of the description to be an occasional source, as the diameter of the light source 6 (potentially limited to the opening 8) is generally much less than the distance between the light source 6 and the surface 3.

The expected refraction index for authentic human skin is less than or equal to $n_{max}$ and the angular criticality range is then bounded by a maximum critical angle $\alpha_{max}$ equal to:

$$\alpha_{max} = \sin^{-1}\left(\frac{n_{max}}{n_{medium}}\right)$$

Preferably, $n_{max}$ is less than or equal to 1.48 and greater than or equal to 1.42 in the domain of visible light.

Likewise, the expected refraction index for authentic human skin is greater than or equal to $n_{min}$ and the angular criticality range is then bounded by a minimum critical angle $\alpha_{min}$ equal to:

$$\alpha_{min} = \sin^{-1}\left(\frac{n_{min}}{n_{medium}}\right)$$

Preferably, $n_{min}$ is greater than or equal to 1.38 and less than or equal to 1.44 in the domain of visible light.

Typically, human skin has a refraction index in the domain of visible light between 1.41 and 1.47. Thus, for instance with a propagation medium 2 having a refraction index $n_{medium}$ of 1.50, the angular criticality range may be between 78° and 70°. It is preferable that the refraction indices expected for human skin be chosen to be less than the refraction index $n_{medium}$ of the propagation medium ($n_{max} < n_{medium}$). For instance, if $n_{medium}$ is 1.49, then $n_{max}$ may be restricted to 1.47, or even 1.45. As the refraction index of human skin decreases when the wavelength increases, one may then use a larger wavelength.

Preferably, the first light path 11 and the second light path 12 defining the angular criticality range are incident to the surface 3 at points belonging to the location planned for receiving the object 5 to be authenticated. Thus, as depicted in FIG. 1, the first light path 11 encounters the surface 3 at a distance $d_{min}$ from the emission side where the light source 6 is found, while the second light path 12 encounters the surface 3 at a distance $d_{max}$ from the emission side where the light source 6 is found. It is observed, obviously, that $d_{max} > d_{min}$. It should be noted that the distance from the light source 6 is what determines the angle of incidence of the light rays. As the light source 6 is occasional, or in any event low in scope compared to the width of the surface 3, the incidence points of all of the first light paths 11 with the surface 3 form a circular arc on the surface 3 with the orthogonal projection of the light source 6 on the surface 3 as its center. The same is true for the second light paths 12.

As a numerical example given for illustration purposes, with a light source placed at a distance 11 mm from the surface 3, a propagation medium made of poly(methyl methacrylate) having a refraction index of 1.49, and expected refraction indices for authentic human skin of between 1.36 and 1.42 for a green light at 525 nm, the result is a distance $d_{min}$ of 24.6 mm and a distance $d_{max}$ of 34.6 mm, where $\alpha_{max} = 72.4°$ and $\alpha_{min} = 65.9°$.

The emission orientation and the emission angle (typically half-intensity) of the light source 6 may be chosen in order to improve the precision of the method. It may be advantages to have lighting on the surface 3 with intensity increasing with distance d from the light source 6, at least at the location intended to receive the object. For instance, it is possible to use a light source 6 having an emission lobe with a peak focused on higher distances, and in particular on the location intended to receive the object. It is possible to orient the emission direction of the light source 6 to the location on the surface 3 intended to receive the object 5. Without orienting the emission direction of the light source 6 to the location on the surface 3 intended to receive the object 5, it is also possible to choose a light source 6 with an adequate angle of emission to obtain a maximum light intensity at the location of the surface 3 intended to receive the object 5.

As an example, the light intensity arriving at any point on the surface 3 may be calculated as a function of the distance d for a light source 6 with an emission orientation parallel to the surface 3. To do so, the reduced variable $x = d/l$ is used, where l is the distance between the light source 6 and the surface 3 (in the examples that follow, l=10.5 mm). The intensity may then be calculated as a function of x, which is:

$$I(x) = \frac{1}{(x^2 + 1)} * \sin(\beta) * I(\beta)$$

Where $\beta$ is the angle formed by the radius with the surface 3 (hence $\alpha + \beta = 90°$) and $I(\beta)$ the intensity of the source for that angle.

We have $\beta = \cot^{-1}(x)$. Where $$\sin(\beta) = \frac{1}{\sqrt{x^2 + 1}}.$$

If we model the emission by $I(\beta) = I_0 * \cos(k*\beta)$, then we have:

$$I(x) = \frac{1}{(x^2 + 1)^{3/2}} * \cos(k * \cot^{-1}(x))$$

For a Lambertian (orthotropic) surface, k=1, so we have a maximum for $$x = \frac{1}{\sqrt{3}},$$

i.e approximately d=6 mm.

For a source whose angle of emission is 60°, k=2, and an emission maximum is found for $$x = \sqrt{\frac{7}{3}},$$

or approximately d=16 mm. For an angle 40°, approximately d=27 mm.

Thus, in the case of a light source 6 with an emission orientation parallel to the surface 3, it is possible to choose a light source 6 with an angle of emission less than 50°, or even 40°, as a function of the position of the surface 3, at which it is desired to have a maximum light intensity.

As the system also comprises a processing unit comprising a processor, the processing unit being configured to determine whether the object matches authentic human skin based on the refraction index of said object, as a function of the spatial light distribution on the acquired image by comparing said spatial distribution to an expected spatial distribution for an authentic human finger according to the invention described here.

Principle of the Invention

An object 5 to be authenticated, disposed on the location provided for that purpose on the surface 3, has a refraction index $n_{object}$ which is to be checked to tell if it matches an expected value for authentic human skin. The interface between the surface 3 and the object 5 to be authenticated defines a critical object angle $\alpha_{object}$ relative to its normal, in the direction of the propagation medium 2.

The light source 6 emits light rays that propagate in the propagation medium 2 in the direction of the surface 3. Those light rays encounter the surface 3 with different angles of incidence $\alpha$. Among the light rays that encounter the surface 3 at the home location, and thus facing the object 5 to be authenticated, some light rays have angles of incidence $\alpha$ which are in the angular criticality range, i.e. between $\alpha_{min}$ and $\alpha_{max}$, while others are outside of the angular range, meaning that they are either less than $\alpha_{min}$, or greater than $\alpha_{max}$.

When a light ray 20 that has an angle of incidence $\alpha_1$ less than the critical object angle $\alpha_{object}$ encounters the surface 3 at the location where the object 5 is found, that light ray 20 passes through the interface between the propagation medium 2 and the object 5, and propagates within the object 5 as a function of its intrinsic optical properties of absorption and diffusion at the wavelength emitted by the light source 6. The interaction between the light ray 20 and the object 5 produces diffused rays 21 that propagate in different directions. Some of the diffused rays 21 thereby propagate toward the propagation medium 2, pass through the surface 3, and through the propagation medium, reaching the imager 4.

Whenever a light ray 22 that has an angle of incidence $\alpha_2$ greater than the critical object angle $\alpha_{object}$ encounters the surface 3 at the location where the object 5 is found, that light ray 22 is totally reflected by the interface formed by the surface 3 between the propagation medium 2 and the object 5 to be authenticated. The light ray 22 therefore does not pass through that interface and thus does not penetrate into the object 5. The reflected light ray 22 propagates into the propagation medium 2, until it encounters an absorption screen 9 where it is absorbed. As in the examples depicted, the absorption screen 9 may be advantageously disposed on a side opposite the light source 6, with the imager 4 between the absorption screen 9 and the light source 6. The absorption screen 9 is, for instance, a layer of black ink.

Thus, the object 5 is illuminated only by the light rays having an angle of incidence lower than the critical object angle $\alpha_{object}$. As the angle of incidence $\alpha$ of the light rays increases with the distance from the light source 6 from their point of incidence with the surface 3, the object 5 is therefore illuminated within a disc centered on the orthogonal projection of the light source 6 onto the surface 3. The light returned by the object 5 is at a maximum within that disc, and decreases as it moves away from the disc, with a decrease following the absorption and diffusion of the medium forming the object 5. For authentic human skin and blue or green light, this decrease is fast enough to make it possible to distinguish it easily.

Consequently, the imager 4 only receives the light rays that have an angle of incidence less than the critical object angle $\alpha_{object}$ and which were able to pass through the surface 3 and diffuse into the object 5. The imager 4 therefore acquires an image from the light of only those light rays that have an angle of incidence less than the critical object angle $\alpha_{object}$. As the angle of incidence $\alpha$ of the light rays increases with distance from the light source 6 of their point of incidence with the surface 3, this discrimination with respect to the light rays received by the imager 4 is spatially reflected in the image acquired by the imager 4. The spatial light distribution on the acquired image therefore depends on the critical object angle $\alpha_{object}$ defined by the surface 3 and the object 5 to be authenticated, which largely depends on the refraction index $n_{object}$ of the object 5 to be authenticated, as well as on the other optical properties of the medium forming the object 5. Because the object 5 is generally diffusing in volume, it is possible to have a fuzzy border in the image, which nonetheless still corresponds to the edge of the light disc of the object 5, while other characteristics of that spatial distribution such as the fuzziness of the border or the maximum intensity depend on the optical properties of absorption $\mu_a$ and reduced diffusion $\mu_s'$ of the object to be authenticated.

The analysis of the spatial light distribution on the acquired image thereby makes it possible to detect whether the reflection index $n_{object}$ of the object 5 to be authenticated corresponds to unexpected refraction index for authentic human skin, and therefore detecting a potential fraud.

Figure 3:
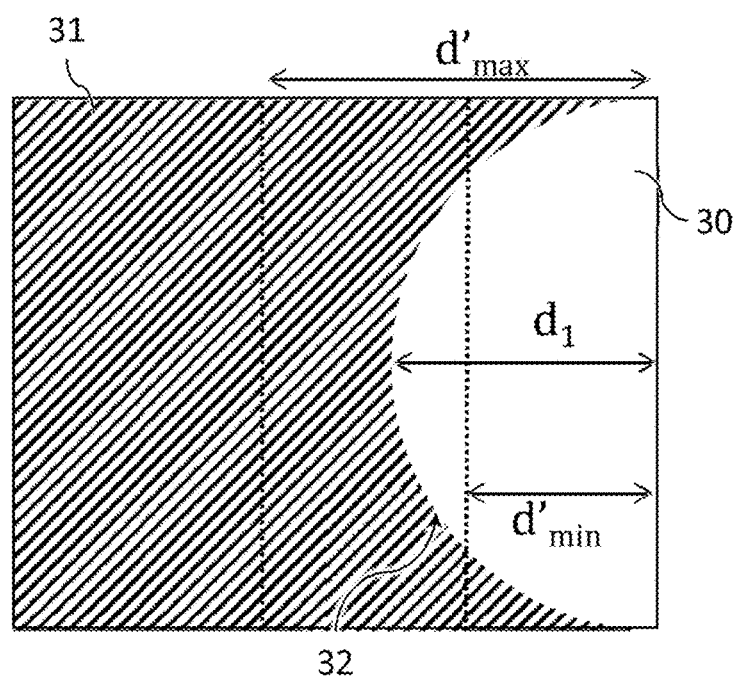
Figure 4:
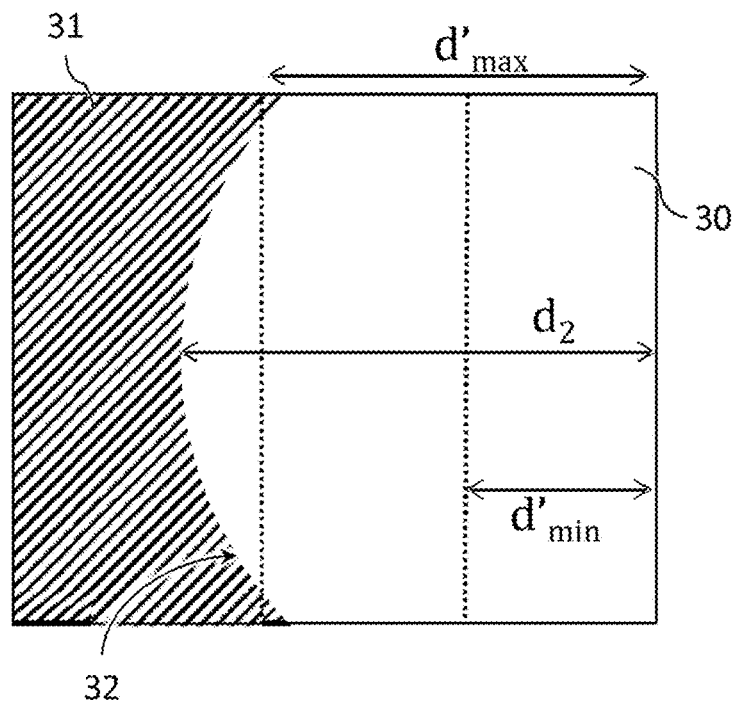
Figure 5:
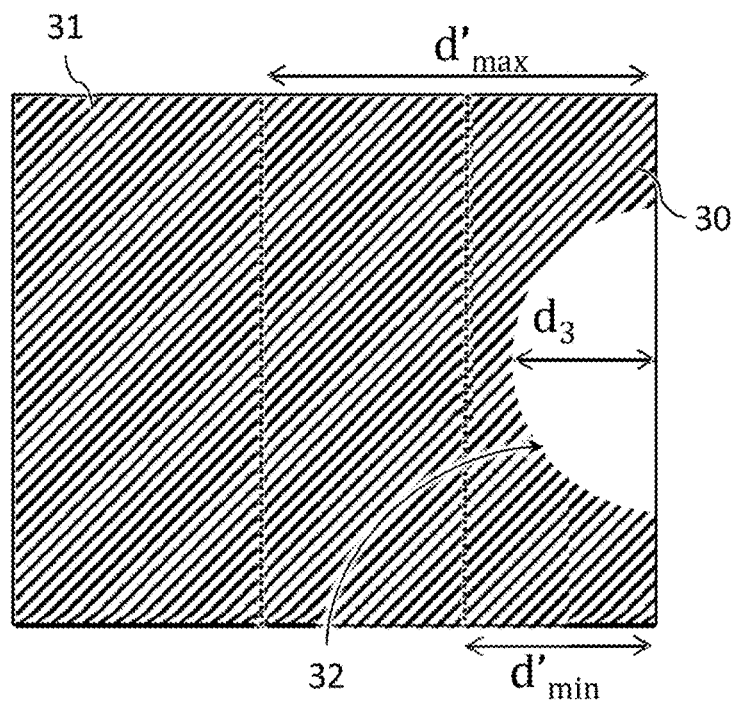

FIGS. 3, 4, and 5 show simplified examples of spatial light distribution on the image required in different circumstances. In the example depicted by FIG. 3, the image has a clear area 30 representing the illuminated portion of the object 5. This image portion corresponds to the part of the imager 4 that received the light rays 21 diffused within the object 5 to be authenticated, those light rays 21 having reached the object 5 in the region where said object 5 was illuminated. The clear area 30 thus results from the light rays whose angles of incidence $\alpha$ were less than the critical object angle $\alpha_{object}$. The clear area 30, therefore, spatially corresponds to the extent of the surface 3 where the light rays were able to pass through the surface 3 and reach the object 5 to be authenticated, meaning the disc centered on the orthogonal projection of the light source 6 on the surface 3 and whose radius depends on $\alpha_{object}$.

The image also has a dark area 31 representing the portion that did not receive light or only received a little light due to diffusion by the object 5, near the clear area 30. The dark area 31 results from the light rays whose angles of incidence $\alpha$ were greater than the critical object angle $\alpha_{object}$ and which, reflected in the direction of the absorption screen 9, could not reach the imager 4. The dark area 31 therefore spatially corresponds to the extent of the surface 3 where the light rays were unable to pass through the surface 3 and reach the object 5 to be authenticated.

There is therefore on the image of the object 5 a border 32 at the transition between the part of the object 5 for which the light derived from the light source 6 was received in the part of the object 5 for which the light derived from light source 6 was not received. This border may fuzzy to a varying extent, depending on the optical diffusion properties of the object 5. Nonetheless, an absorption limit may be deduced from that border 32 in order to determine whether the object 5 presented has a reflection index corresponding to authentic human skin. Like the points of incidence of all of the first light paths 11 and second light paths 12 with the surface 3, the border 32 forms an arc of a circle on the surface 3 centered on the light source 6. It may therefore be advantageous to consider a distance representative of the radius of that arc of a circle corresponding to the illumination limit of the object 5 by the light source 6.

Thus, in the non-limiting examples that follow, only the distances recorded along a single straight line will be taken into account for comparison purposes, here, in a non-limiting example, for a straight line running from the light source 6 to the medium of the surface 3, where the distances recorded reach their minimum values.

In the example in FIG. 3, the border 32 reaches a distance $d_1$ relative to the origin side of the light rays, meaning the side where the light source 6 is found. That distance $d_1$ is greater than the distance $d'_{min}$ that corresponds to the distance $d_{min}$ where the first light path 11 encounters the surface 3, forming with the normal to the surface 3 the angle of incidence $\alpha_{min}$ corresponding to the minimum refraction index expected for authentic human skin $n_{min}$. The distance $d_1$ is less than the distance $d'_{max}$ that corresponds to the distance $d_{max}$ where the second light path 12 encounters the surface 3, forming with the normal to the surface 3 the angle of incidence $\alpha_{max}$ corresponding to the maximum refraction index expected for authentic human skin $n_{max}$. The border 32 is therefore found within a space between $d'_{max}$ and $d'_{min}$ which corresponds to light rays in the angular criticality range. This means that the object 5 has a refraction index $n_{object}$ of between $n_{min}$ and $n_{max}$, meaning a refraction index $n_{object}$ that can match a refraction index expected for authentic human skin. The object 5 is therefore probably authentic human skin.

In the example in FIG. 4, the border 32 reaches a distance $d_2$ relative to the origin side of the light rays, meaning the side where the light source 6 is found. This distance $d_2$ is greater than the distance $d'_{max}$ that corresponds to the distance $d_{max}$ where the second light path 12 encounters the surface 3, forming with the normal to the surface 3 the angle of incidence $\alpha_{max}$ corresponding to the maximum refraction index expected for authentic human skin $n_{max}$. The border 32 is therefore found outside the space between $d'_{max}$ and $d'_{min}$ which corresponds to light rays in the angular criticality range. This means that the object 5 has a refraction index $n_{object}$ greater than $n_{max}$, meaning a refraction index $n_{object}$ that cannot match a refraction index expected for authentic human skin. The object 5 is therefore a fraud.

It is also possible to not have a dark area 31, and to have a clear area 30 covering the entire image. This means that the entire imager 4 received diffused rays 21 coming from light rays 20 having an angle of incidence $\alpha_1$ less than the critical angle $\alpha_{object}$ encounters the surface 3 at the location where the object is found 5, and that consequently the light rays incident to the surface 3 above even $d_{max}$ had an angle of incidence $\alpha_1$ less than the critical angle $\alpha_{object}$. This means, therefore, that the critical angle $\alpha_{object}$ is very high, and in particular above the maximum critical angle $\alpha_{max}$. Since the critical angle $\alpha_{object}$ is derived from the refraction index of the object 5, this means that the object 5 has a very high refraction index $n_{object}$ far above what authentic human skin could exhibit. Consequently, the absence of a border when that clear area 30 covers the entire image indicates that the object 5 is a fraud.

In the example in FIG. 5, the border 32 reaches a distance $d_3$ relative to the origin side of the light rays, meaning the side where the light source 6 is found. That distance $d_3$ is less than the distance $d'_{min}$ that corresponds to the distance $d_{min}$ where the first light path 11 encounters the surface 3, forming with the normal to the surface 3 the angle of incidence $\alpha_{min}$ corresponding to the minimum refraction index expected for authentic human skin $n_{min}$. The border 32 is therefore found outside the space between $d'_{max}$ and $d'_{min}$ which corresponds to light rays in the angular criticality range. This means that the object 5 has a refraction index $n_{object}$ less than $n_{min}$, meaning a refraction index $n_{object}$ that cannot match a refraction index expected for authentic human skin. The object 5 is, therefore, a fraud.

It is also possible to not have a clear area 30, and to have a dark area 31 covering the entire image. This means that the imager 4 received diffused rays 21 coming from light rays 20 having an angle of incidence $\alpha_1$ less than the critical object angle $\alpha_{object}$ encounters the surface 3 at the location where the object is found 5, and that consequently the light rays incident to the surface 3 before even $d_{min}$ had an angle of incidence $\alpha_1$ greater than the critical angle $\alpha_{object}$. This means therefore that the critical object angle $\alpha_{object}$ is very low, and in particular below the minimum critical angle $\alpha_{min}$. Since the critical object angle $\alpha_{object}$ is derived from the refraction index of the object 5, this means that the object 5 has a very low refraction index $n_{object}$ far below what authentic human skin could exhibit. Consequently, the absence of a border when that dark area 31 covers the entire image indicates that the object 5 is a fraud.

Steps of the Method

Preferentially, a first image may be acquired, for example by the imager 4, with lighting by another light source of the sensor 1 than the light source 6, typically a light source used to acquire images that serve to implement biometric identification based on comparing fingerprints extracted from acquired images with fingerprints from a database. It is advantageous to use a light source illuminating the entire object 5 present on the surface 3, particularly with light rays that have a low angle of incidence to the surface 3, less than the critical angle of the interface between the propagation medium and the air. That first image particularly makes it possible to obtain an image of the object 5 placed on the surface 3, and may be used to standardize the signal of a second image obtained with lighting by the light source 6 in order to overcome local variations in the optical coupling of the object 5 with the surface 3 or reflectance variations in human skin and/or to restrict the area of the second image used to the locations where the object 5 is in contact with the surface 3.

A second image is therefore acquired by the imager 4 with lighting of the surface 3 (and potentially the object 5) by the light source 6 as previously described. It is possible to identify in that second image the position of the object 5 to restrict the area of the second image used to the locations where the object 5 is in contact with the surface 3, if a first image is not being used. Preferably, it is possible to acquire a third image without lighting. That third image may be subtracted from the second image in order to delete from said the second image the effects of any ambient lighting, particularly by the sun or strong artificial light illuminating the sensor 1 and the object 5. The third image may also be subtracted from the first image for the same reasons.

It is the second image that is preferably exploited in order to determine whether the object 5 matches authentic human skin based on the refraction index of said object. That second image is hereafter simply designated by the term "image." Naturally, it is understood to be possible to expose the acquired image or different acquired images to preprocessing in order to improve the use of those images. For instance, one may standardize the acquired images in order to offset potential unevenness in lighting, with an image correction determined at an earlier point (such as when calibrating the sensor).

The determination of whether there is a match between object 5 and authentic human skin is done based on the spatial light distribution on the image acquired by the imager 4. To do so, that spatial distribution is compared to an expected spatial distribution for authentic human skin, using a light intensity profile.

Figure 6:
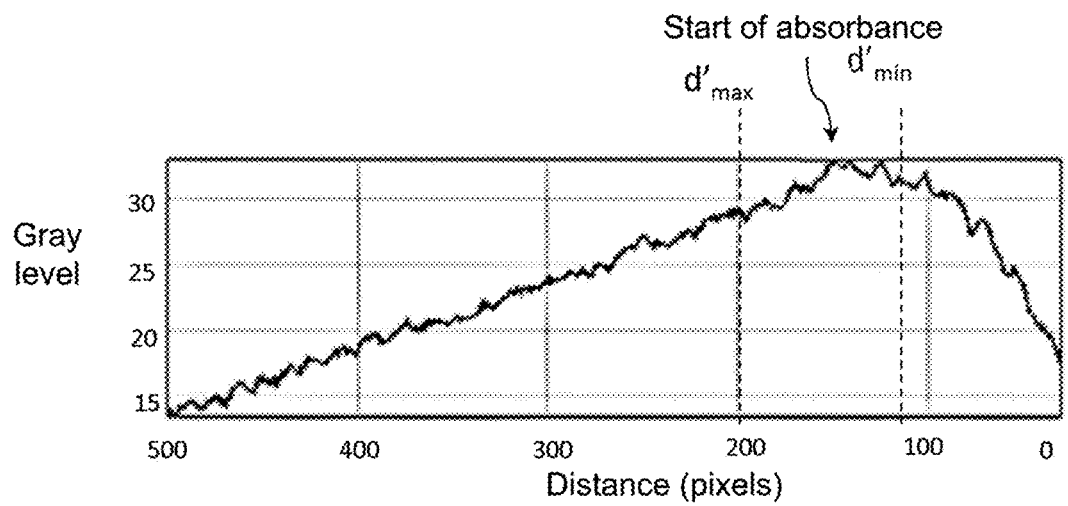
Figure 7:
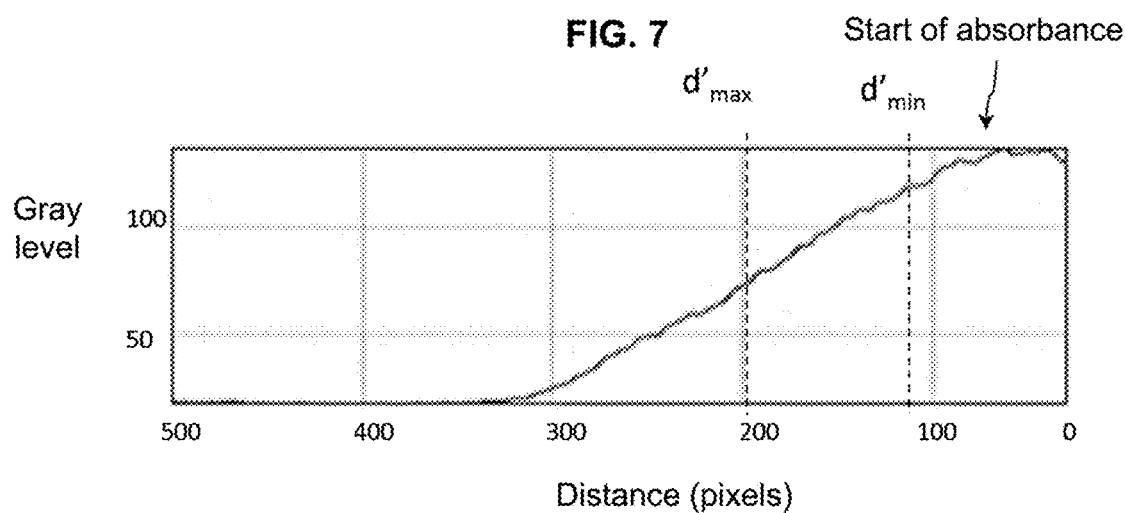
Figure 8:
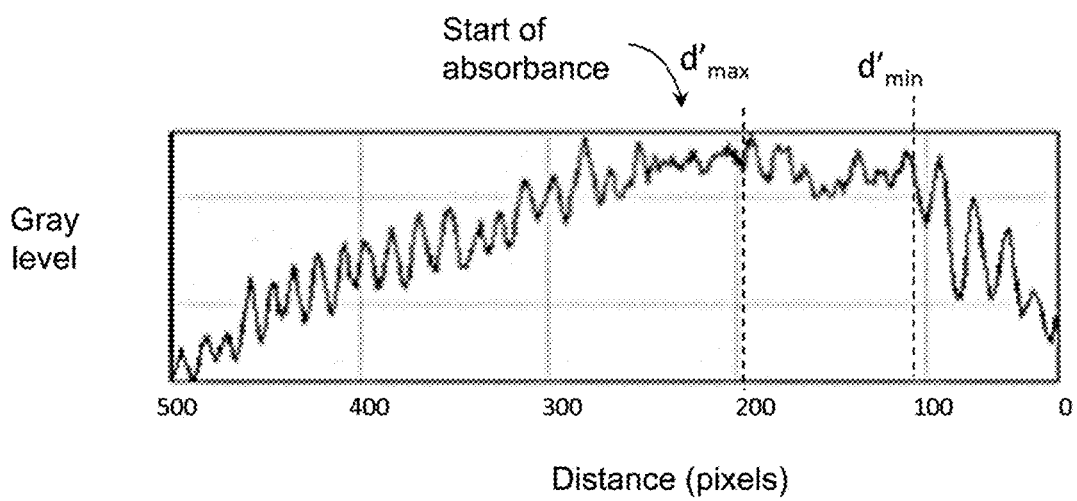

To compare the spatial distribution, a light intensity profile based on a distance from the light source 6, as depicted in FIGS. 6, 7, 8, is determined from the acquired image. The light intensity profile may be determined from multiple images acquired. This light intensity profile is representative of the spatial light distribution on the image acquired. A characteristic derived from the intensity profile is compared to at least one baseline characteristic representative of a light intensity profile corresponding to a spatial distribution expected for authentic human skin. Because the spatial light distribution depends at least on the refraction index of the object 5, the light intensity profile which is derived from it also depends on the refraction index of the object 5. Preferably, the characteristic derived from the intensity profile is chosen to also depend on the refraction index of the object 5, and therefore vary based on the refraction index of the object 5. The same is true for the baseline characteristic, which depends on a refraction index expected for authentic human skin. In particular, the baseline characteristic may correspond to a light path comprising a critical angle defined by the refraction index $n_{medium}$ of the propagation medium and by a refraction index expected for authentic human skin.

The light intensity profile is determined from the image acquired. The light intensity profile, therefore, takes into account a distance appearing in this acquired image. The light intensity profile should only be a function of a distance to the light source, without the need to precisely determine this distance. It only needs to be reflected in the intensity profile, that is to say that the profile accounts for the evolution of the light intensity as a function of a distance to the source. It suffices simply that the intensity profile keeps the distribution of the light intensity as a function of a distance to the light source, regardless of any scale deformations or other. As a simplified example, it is sufficient for the elements farthest from the light source appearing in the acquired image to be taken into account at one end of the profile, whereas the elements closest to the light source appearing in the acquired image are taken into account at the other end of the profile. Moreover, the acquired image being typically two-dimensional, the different distances are projected on the acquired image, so that it does not matter which distance is retained.

As a result, numerous methods are possible to derive a light intensity profile based on the distance from the light source 6. One may, in particular, determine the intensities along a single straight line, for instance running from the projection of the light source 6 to the middle of the image, where the recorded distances reach their minimum values, extracting the gray levels of image pixels located on that straight line. This is what was done in FIGS. 6 to 8. It is possible to take a narrow rectangle in front of the expected rays instead of the straight line, said rectangle extending in length from the projection of the light source 6 and running along its length to the middle of the image, and to consolidate its intensity values, such as by taking the averages of the gray levels along the same abscissa. It is also possible to calculate for a set of pixels equidistant from the light source 6 (and therefore forming the arcs of circles mentioned above), the average of the gray levels of said pixels, or another similar value, potentially using thresholds in order to keep only the lightest pixels (corresponding to the points where the object 5 to be authenticated is in contact with the blade). Next, the projections on an axis of the average values consolidated along a plurality of arcs of circles with radii corresponding to the abscissa of that axis are used. The grouping of pixels equidistant from the light source 6 enables a more robust determination of the consequences of the absorption limit, or absorption slope, but may erase some other characteristics, particularly variability. In fact, optical characteristics of the object 5 other than the refraction index can be exploited to detect a fraud, in addition to the refraction index. Thus, the variability of the light intensity profile can give indications about the absorption coefficient $\mu_a$ and reduced diffusion coefficient $\mu_s'$ of the object 5 to be authenticated, and therefore also be used to detect frauds.

At an earlier point, or instead of calculating the average, it is possible to use a potential first image determine a presence mask by applying a threshold filter (such as the Otsu method) to the gray levels of the pixels of said first image, and to keep only the pixels of the image corresponding to the presence mask. It is also possible to calculate the scalar product between the pixels of the first image in the pixels of the image.

Once the intensity profile has been acquired, at least one characteristic derived from the light intensity profile can be determined. This characteristic may be of different types.

The derived characteristic obviously depends on the choice of what baseline characteristic it must match. Thus, when the derivative characteristic is a distance relative to the projection of the light source 6 on the surface 3 (or another similar reference point), as regards its representation the acquired image, the baseline characteristic may particularly be a baseline position corresponding to $d'_{max}$ or $d'_{min}$. There may be multiple baseline positions, in particular $d'_{max}$ and $d'_{min}$ or intermediate positions.

In particular, the match between the object 5 and authentic human skin may comprise determining a decrease position representative of an absorption limit corresponding to a transition (potentially a fuzzy one) between the portion of the image for which light derived from the light source 6 was received and the portion of the image for which light derived from the light source 6 was not received, or more specifically the quantity of light starts to decrease due to the reflection at the interface between the surface 3 and object 5. The decrease position may, for instance, be the distance from the projection of the light source 6 on the image at which an absorption limit appears, or another characteristic related to that phenomenon. The authenticity of the object 5 is then determined by comparing the decrease position (or a similar characteristic) and the baseline position.

More specifically, the decrease position is compared to an absorbance range bounded by a first baseline position corresponding to a maximum refraction index $n_{max}$ expected for authentic human skin, i.e. $d'_{max}$, and a second baseline position corresponding to a minimum refraction index $n_{min}$ expected for authentic human skin, i.e. $d'_{min}$, and the object 5 is determined as being covered with authentic human skin if the decrease position is within the absorbance range, the object 5 is determined as not being covered with authentic human skin if the decrease position is outside the absorbance range, FIGS. 6, 7, and 8 depict example light intensity profiles as a function of the distance from the light source 6 on images acquired with different objects 5. Those images were acquired with a light source 6 emitting green light with an angle of emission less than 50°, placed on the right in the Figures, with a direction of lighting parallel to the surface 3. The lighting received at the object 5 to be authenticated is therefore not uniform, and has a maximum spatially close to $d_{max}$, and preferably further away from the light source 6 than $d_{max}$. Consequently, the maximum potential intensity (i.e. the maximum potential gray level) in FIGS. 6, 7, and 8 is located just after $d_{max}$. However, in the intensity profiles illustrated, the maximum intensity reached and its position depend on numerous factors. In the first place, absorption due to angles of incidence and therefore refraction indices is essential for the maximum intensity position, because the maximum intensity can only be reached before the absorption limit. Next, the other optical properties of human skin such as the absorption coefficient $\mu_a$ and diffusion coefficient $\mu_s'$ influence the maximum intensity value. The maximum intensity, representative of the albedo, may also be used to detect frauds. In any circumstance, it is possible to detect an inconsistency between the absorbance position determined from the light intensity profile and a baseline position, to the extent that that baseline position takes into account various acquisition parameters.

FIG. 6 shows an example light intensity profile as a function of the distance from the light source 6 on an image required with the human finger (covered with authentic human skin) positioned in a location provided on the surface 3. More specifically, the gray levels of the pixels in a line are depicted there as a function of the distance in pixels. By moving from right to left on the profile, it is visible that the light intensity first increases, before and after d'$_{min}$ (about 120 pixels). In such cases, the light intensity has maximum values. Next, it can be seen that from a distance of about 160 pixels, the light intensity regularly decreases. This is the absorbance phenomenon, related to the object's refraction index. This means that beginning from that start of absorbance, the angles of incidence of the light rays, which increase with distance from the light source 6, exceed the critical object angle $\alpha_{object}$. However, this start of absorbance occurs at a distance of between d'$_{min}$ and d'$_{max}$, therefore indicating that the critical object angle $\alpha_{object}$ is within the angular criticality range between $\alpha_{min}$ and $\alpha_{max}$. The refraction index of the object 5 corresponds to an index expected for human skin. In this example, the decrease position may then be 160 (distance in pixels), while the first baseline position may be 200 (distance in pixels), and the second baseline position may be 120 (distance in pixels). The decrease position is therefore within the absorbance range. It may therefore be determined, based on the refraction index of the object 5, that it is made of human skin, and therefore authenticated.

It should be noted that other characteristics derived from spatial distribution may be used to authenticate the object 5, particularly in addition to characteristics related to the refraction index. For instance, it is possible to determine the slope of the decrease of light intensity that follows the start of absorbance, said slope of decrease being particularly representative of optical diffusion within the object 5.

FIG. 7 shows an example light intensity profile as a function of the distance from the light source 6 on an image required with a fraud in the form of wet paper onto which a fingerprint image has been printed, positioned in the location provided on the surface 3. Compared to the profile illustrated by FIG. 6, it is observed that the profile has a start of absorbance located before 120 pixels, and therefore before d'$_{min}$, indicating that the critical object angle $\alpha_{object}$ is less than $\alpha_{min}$ meaning that the refraction index of the object 5 is below the minimum refraction index expected for authentic human skin n$_{min}$. In this example, the decrease position may then be 80 (distance in pixels), while the second baseline position may be 120 (distance in pixels). The decrease position is therefore not within the absorbance range. It is therefore probably a fraud.

It is also observed that the maximum intensity exceeds the value 100, while the maximum intensity in FIG. 6 did not exceed 30. The maximum intensity is representative of the albedo of the object presented, and arises in particular from the optical properties of the presented object 5 such as absorption (besides the difference between the position of the maximum relative to the position of the potential maximum already mentioned). The maximum intensity may therefore also be used supplementally to detect frauds, when his value differs too much from that of authentic human skin.

As already mentioned, the decrease slope of the profile (after the start of absorbance) is substantially greater on the profile of FIG. 7 then on the profile of FIG. 6, which shows that it is also possible to use that slope as a characteristic derived from the spatial light distribution on the profile. More generally, analyzing the part of the profile following the start of absorbance makes it possible to determine whether the absorption of light by the object corresponds to absorption by authentic human skin.

FIG. 8 shows an example light intensity profile as a function of the distance from the light source 6 on an image required with a fraud in the form of glue having a fingerprint relief, positioned in the location provided on the surface 3. Compared to the profile illustrated in FIG. 6, it is observed that the profile has a start of absorbance located at a distance of about 220 pixels away, and therefore after d'$_{max}$. In this example, the decrease position may then be 220 (distance in pixels), while the first baseline position may be 200 (distance in pixels). The decrease position is therefore not within the absorbance range. This is therefore a fraud, because the refraction index of the presented object is greater than the refraction indices expected for authentic human skin. It is also observed that the profile is much more irregular than the one illustrated by FIG. 6, which may lead to a fraud being detected. This is because such an irregularity is representative of the geometric and optical properties of the glue (particularly, its high diffusion), which substantially differ from human skin.

In the examples above, it was assumed for simplicity's sake that the start of absorbance was easily identifiable, which is not always the case. Other characteristics related to that absorbance based on the refraction indices may therefore be adopted, such as a gradient maximum, or reaching a given percentage (typically 50%) of the maximum intensity. Naturally, the baseline characteristics are then chosen to be different from d'$_{min}$ and d'$_{max}$ to reflect those choices. However, the baseline characteristics always correspond to a light path comprising a critical angle defined by the refraction index n$_{medium}$ of the propagation medium 2 and by a refraction index expected for authentic human skin.

Furthermore, the variability of the characteristics of human skin make it preferable to take into account the difference that appears between a characteristic derived from spatial distribution and at least one baseline characteristic, rather than a binary "authentic" or "fraud" result. A probability is therefore preferably determined as to whether the object 5 is a fraud based on a lower that is a function of the difference relative to the closest baseline characteristic, such as a distance between the absorbance limit relative to d'$_{min}$ or d'$_{max}$.

As mentioned, different characteristics can therefore be used that are derived from the light intensity profile besides the position of the absorbance limit, such as the position or value of the maximum, and the decrease slope above that absorbance limit. It is even possible to combine multiple characteristics, and compare them to combinations of characteristics representative of authentic human skin or frauds. For instance, one may use a threshold of learning technique, such as support vector machines (SVMs).

It is also possible to directly compare the spatial light distribution to a template representative of the light response of authentic human skin. The derived characteristic is then a shape of the light intensity profile, and the determining of whether the object matches authentic human skin corresponds to comparing the shape of the light intensity profile to a plurality of baseline profiles corresponding to known optical characteristics, said known optical characteristics comprising at least different refraction indices. The baseline profiles may additionally correspond to different absorption or diffusion coefficients.

For instance, one may calculate a similarity (or conversely, dissimilarity) measurement, such as a mathematical distance between the studied profile, drawn from the acquired image and one or more baseline profiles. Various characteristics related to the shape of the profile may be analyzed to make this comparison, such as the position of an inflection point, distances, slopes before or after an inflection point, etc. If the studied profile is closer to a baseline profile corresponding to authentic human skin, then the presented object is covered with authentic human skin. Conversely, if the studied profile is closer to a baseline profile corresponding to a particular fraud, then the presented object is probably that particular fraud.

Alternatively, one may deduce various values representative of optical characteristics of the object 5, in addition to the refraction index, such as absorption $\mu_a$ and reduced diffusion $\mu_s'$ coefficients of the object 5 to be authenticated, by comparing the profile to a profile base corresponding to homogeneous media with known optical properties. Finally, one may simply present the profile to a CNN (convolutional neural network) trained to separate profiles from authentic human skin and profiles from frauds.

The method is used to detect the fraud in order to authenticate that an object is covered with authentic human skin. It may advantageously form part of a biometric identification method comprising the comparison of fingerprints extracted from an acquired image with those from a database, in particular based on local singular points (also known as minutiae).

The invention also relates to a computer program product comprising program code instructions for carrying out the steps of the method according to any of the embodiments previously described when said program is run by a computer.

The invention is not limited to the embodiment described and depicted in the attached figures. Modifications remain possible, particularly from the viewpoint of creating various technical characteristics or substituting technical equivalents, without departing from the scope of protection of the invention.

The invention claimed is:

1. A fraud detection method to authenticate that an object is covered by human skin, said object having a refraction index and being placed in a home location on a surface of a propagation medium of a sensor, said propagation medium having a refraction index $n_{medium}$, the method comprising the following steps:
   lighting the home location of the surface through the propagation medium by incident light rays propagating within the propagation medium from a light source, said incident light rays illuminating the home location forming with said surface a plurality of incidence angles encompassing at least one critical angle defined by the refraction index $n_{medium}$ of the propagation medium and by a refraction index expected for authentic human skin,
   receipt, by an imager, of light rays propagating within the propagation medium coming from the surface, said light rays coming from incident light rays forming angles of incidence with the surface that are less than or equal to a critical angle defined by the refraction index $n_{medium}$ of the propagation medium and by the refraction index of the object to be authenticated, and acquisition of an image by the imager, said image having a spatial light distribution depending on at least the object's refraction index,
   based on the image acquired, determining a light intensity profile as a function of a distance from the light source, the light intensity profile being representative of a spatial light distribution on the image acquired, based on a distance from the light sourced, said light intensity profile depending on at least the object's refraction index,
   determining at least one characteristic derived from the light intensity profile, the characteristic derived from the light intensity profile depending on the refraction index of the object,
   determining whether there is a match between the object and authentic human skin by comparing the characteristic derived from the light intensity profile to a baseline characteristic representative of a light intensity profile corresponding to an expected spatial distribution for authentic human skin, said baseline characteristic depending on a refraction index expected for authentic human skin, and
   authenticating the object or not, based on whether said object is covered with human skin according to the match determined,
   wherein the expected refraction index for authentic human skin is less than or equal to a maximum expected refraction index $n_{max}$ and the plurality of angles of incidence formed by light rays comprises incidence angles α greater than $$\sin^{-1}\left(\frac{n_{max}}{n_{medium}}\right)$$

where $n_{max}$ is less than or equal to 1.48 and greater than or equal to 1.42.

2. The method according to claim 1, wherein the baseline characteristic corresponds to a light path comprising a critical angle defined by the refraction index $n_{medium}$ of the propagation medium and by a refraction index expected for authentic human skin.

3. The method according to claim 1, wherein the characteristic derived from the light intensity profile is representative of a decrease in light intensity in the light intensity profile.

4. The method according to claim 3, wherein the characteristic derived from the light intensity profile is a light intensity decrease position in the light intensity profile, and the baseline characteristic is a baseline position.

5. The method according to claim 4, wherein the decrease position is compared to an absorbance range bounded by a first baseline position corresponding to a maximum refraction index expected for authentic human skin and a second baseline position corresponding to a minimum refraction index expected for authentic human skin, and
   the object is determined as being covered with authentic human skin if the decrease position is within the absorbance range,
   the object is determined as not being covered with authentic human skin if the decrease position is outside the absorbance range.

6. The method according to claim 1, wherein the expected refraction index for authentic human skin is greater than or equal to a minimum expected refraction index $n_{min}$ and the plurality of angles of incidence formed by light rays comprises incidence angles α greater than $$\sin^{-1}\left(\frac{n_{max}}{n_{medium}}\right)$$

where $n_{min}$ is greater than or equal to 1.38 and less than or equal to 1.44.

7. The method according to claim 1, wherein the derived characteristic is a shape of the light intensity profile, and the determining of whether the object matches authentic human skin corresponds to comparing the shape of the light intensity profile to a plurality of baseline profiles corresponding to known optical characteristics, said known optical characteristics comprising at least refraction indices.

8. The method according to claim 1, wherein the incident light rays illuminating the home location of the surface are in wavelengths less than 600 nm.

9. The method according to claim 8, wherein the incident light rays illuminating the home location of the surface are in wavelengths less than 600 nm, and other incident light rays illuminating the home location of the surface are in wavelengths greater than 600 nm.

10. A computer program product comprising program code instructions for carrying out the steps of the method according to claim 1 when said program is run by a computer.

11. A biometric analysis system for an object to be authenticated as being covered in human skin, comprising a sensor, said sensor comprising:
- a propagation medium comprising a surface with a home location intended to receive the object to be authenticated,
- a light source configured to light the home location of the surface through the propagation medium by incident light rays propagating within the propagation medium, said incident light rays intended to illuminate the home location forming with said surface a plurality of incidence angles encompassing at least one critical angle defined by the refraction index $n_{medium}$ of the propagation medium and by a refraction index expected for an authentic human finger,
- an imager adapted to receive light rays propagating within the propagation medium coming from the surface, said light rays coming from incident light rays forming angles of incidence with the surface that are less than or equal to a critical angle defined by the refraction index $n_{medium}$ of the propagation medium and by the refraction index of the object to be authenticated, and for acquiring an image, the system being configured to:
- based on the image acquired, determine a light intensity profile as a function of a distance from the light source, the light intensity profile being representative of a spatial light distribution on the image acquired, based on a distance from the light source, said light intensity profile depending on at least the object's refraction index,
- determining at least one characteristic derived from the light intensity profile, the characteristic derived from the light intensity profile depending on the refraction index of the object,
- determining whether there is a match between the object and authentic human skin by comparing the characteristic derived from the light intensity profile to a baseline characteristic representative of a light intensity profile corresponding to an expected spatial distribution for authentic human skin, said baseline characteristic depending on a refraction index expected for authentic human skin, and
- authenticating the object or not, based on whether said object is covered with human skin according to the match determined, and
- wherein the expected refraction index for authentic human skin is less than or equal to a maximum expected refraction index $n_{max}$ and the plurality of angles of incidence formed by light rays comprises incidence angles α greater than $$\sin^{-1}\left(\frac{n_{max}}{n_{medium}}\right)$$

where $n_{max}$ is less than or equal to 1.48 and greater than or equal to 1.42.

* * * * *